United States Patent [19]
Eggert, Jr.

[11] 3,711,902
[45] Jan. 23, 1973

[54] COUPLING STRUCTURE FOR JOINING CONTAINERS

[75] Inventor: Walter S. Eggert, Jr., Huntingdon Valley, Pa.

[73] Assignee: The Budd Company, Philadelphia, Pa.

[22] Filed: Dec. 22, 1971

[21] Appl. No.: 210,701

[52] U.S. Cl. ................ 24/81 E, 220/1.5, 280/DIG. 8
[51] Int. Cl. .......................... A44b 21/00, B65j 1/04
[58] Field of Search ...... 296/35 A; 294/67 DA, 67 R; 24/81 E, 211 P, 211 R; 105/366 R, 366 A, 366 B, 366 C, 366 D, 366 E; 280/DIG. 8, 179 R, 179 A, 179 B; 214/38; 287/2; 248/119 R, 361 R; 220/1.5

[56] References Cited

UNITED STATES PATENTS

| 2,053,969 | 9/1936 | Olds | 214/38 |
| 3,086,673 | 4/1963 | Tantlinger et al. | 220/1.5 |
| 3,365,229 | 1/1968 | Hitch et al. | 294/67 R |
| 3,428,002 | 2/1969 | McIntire et al. | 248/119 R X |

*Primary Examiner*—Donald A. Griffin
*Attorney*—Thomas I. Davenport et al.

[57] ABSTRACT

Coupling mechanism for supporting and positioning a plurality of containers into an array. The mechanisms are captive to corner fittings of the containers and enable individual container to be joined together to form arrays which can be liftable in various configurations. The elements making up the mechanism provide the sole means for supporting, positioning and restraining the built-up arrays.

3 Claims, 6 Drawing Figures

INVENTOR.
Walter S. Eggert, Jr.

PATENTED JAN 23 1973 3,711,902
SHEET 2 OF 2
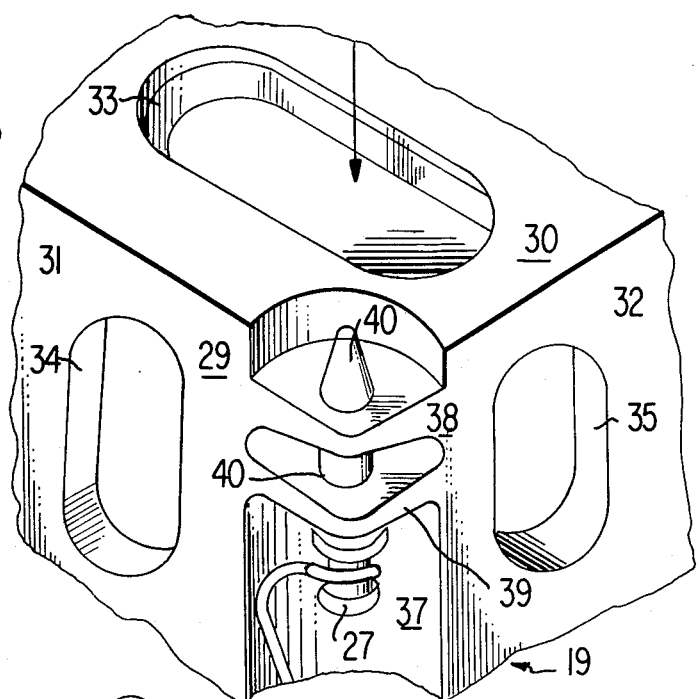
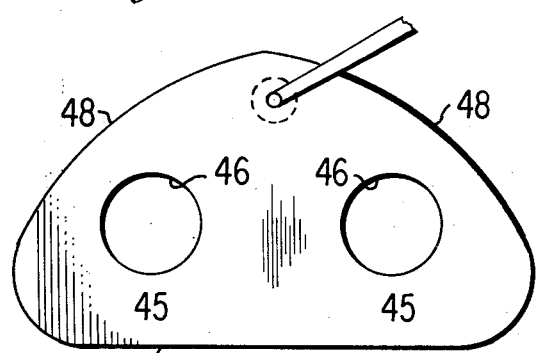
Fig. 3
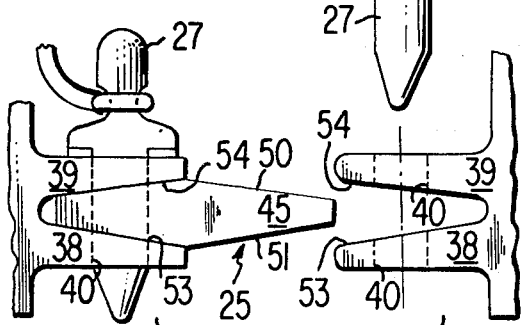
Fig. 5
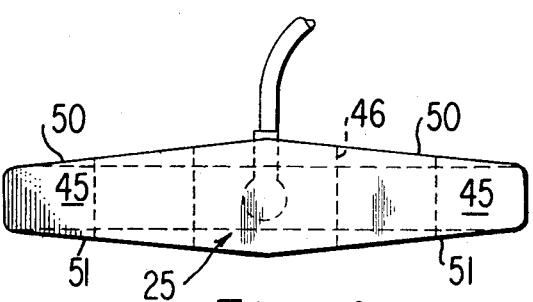
Fig. 4
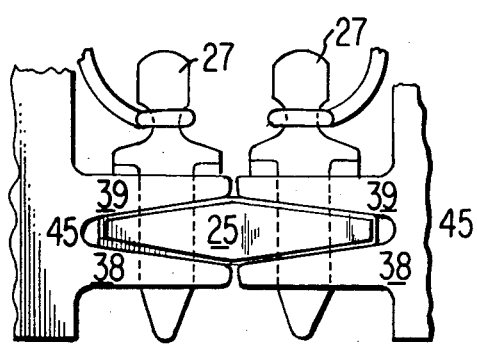
Fig. 6
INVENTOR.
Walter S. Eggert, Jr.
BY
William R. Nolte
AGENT

COUPLING STRUCTURE FOR JOINING CONTAINERS

Heretofore, exporters and shippers, particularly in periods of overseas operations such as those in Korea and Southeast Asia, have realized the need for containerization. The use of standard containers has had some drawbacks and disadvantages which have hindered efficient operations. Various overseas ports do not always have handling equipment suitable for large containers. In addition subsequent transport of such large containers over marginal terrain as for example as encountered in Southeast Asia is difficult. Other difficulties arise due to the fact that the wide variety of cargo shipped from food to ammunition, electronic gear and spare parts requires a flexibility in container size. Moreover in other instances less than full container lot sizes are frequently shipped in many cases.

Accordingly it is the principal object of this invention to provide an improved coupling mechanism for joining containers of various sizes together which avoids one or more of the disadvantages of the prior art.

It is another important object of this invention to provide coupling mechanism to enable containers of small size to be assembled in arrays of larger size and which can there-after be separated into smaller units that can be handled by available equipment for field transport by the user.

It is still another object of this invention to provide coupling mechanism to enable containers of small size to be assembled into an array of containers of a larger size and which are freely interchangeable with each other thereby eliminating the need for repackaging and correspondingly reducing pilferage of the same.

It is still another important object of this invention to provide coupling mechanism including corner fittings for adjacent containers to enable the containers to be easily assembled and disassembled in a field environment, while such containers are loaded to rated capacity, by unskilled personnel using standard hand tools and handling equipment.

In accordance with the invention a coupling mechanism is provided for securing together adjacent aligned containers each having corner fittings and movable so that the corner fitting of one container is in opposed relationship to a like corner fitting of an other container. The corner fittings of the opposed containers having apertured tongue elements disposed in spaced apart relationship. Apertured plate means are movable into engagement with the tongue members of the opposed fittings so that the apertures in the plate are aligned with the apertures in the tongue elements and lock pin means are provided to pass through the apertures to lock the one and other containers together.

For a better understanding of the present invention together with other and further objects thereof, reference is had to the following description taken in connection with the accompanying drawings.

In the drawing

FIG. 2 is a three quarter elevational view illustrating a portion of one of the top corner fittings of one of the containers;

FIG. 3 is a top plan view of a spanning lock plate which is used to interconnect a corner fitting of one container to a corner fitting of an opposed container;

FIG. 4 is a front elevational view of the connecting lock plate illustrated in FIG. 3;

FIG. 5 is a partial view of the lower corner fittings of the adjacent opposed containers shown in FIG. 1;

FIG. 6 is a view similar to FIG. 5 but showing the corner fittings of the opposed containers in interlocked relationship.

Figure 1:
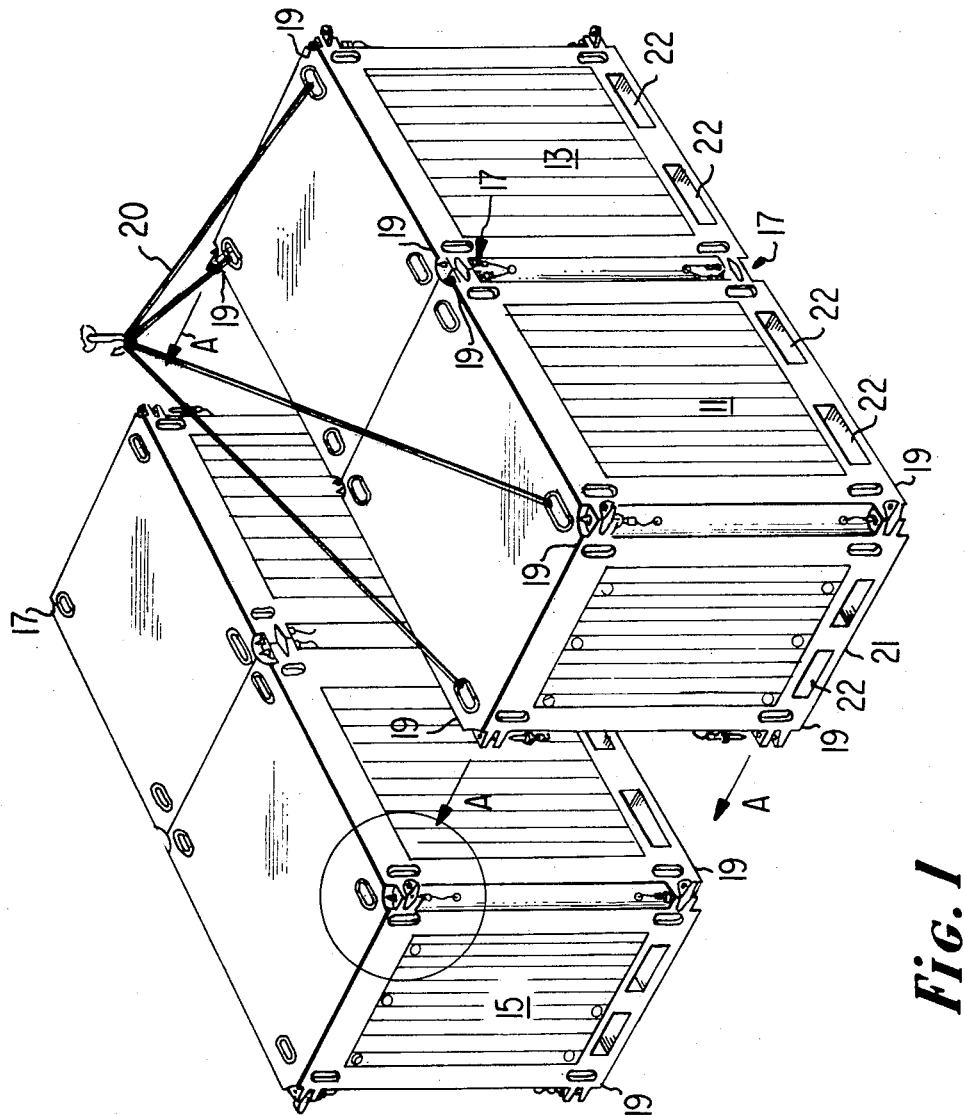
FIG. 1 is an elevational view showing a first pair of small containers joined by the coupling mechanism of the present invention and aligned with another container of larger size for coupling engagement therewith.

Referring to FIG. 1 of the drawing there is shown a plurality of cargo containers 11, 13 and 15 each being of rectangular configuration. Containers 11 and 13 are illustrated as being joined together in a lateral direction by means of the coupling structure 17 of the present invention. The coupling structure 17 includes corner fittings 19 of adjacent containers which enable the container 11, 13 to be hoisted and moved in the direction of arrows A jointed as indicated by the cable lines 20 into interface engagement with larger container 19. Moreover each of the containers 11, 13 include a floor structure having openings 22 to enable the same to be lifted by conventional fork lift truck means. Container 15 is also illustrated as including a floor structure 23 having openings 24 to enable it to likewise be lifted by a fork lift truck or to be hoisted by cable means as illustrated in connection with container 11 and 13. With reference now to FIGS. 2, 3 and 5 the coupling structure 17 for joining two cargo containers in addition to the opposed corner fittings 19 of adjacently disposed containers also comprises an interlock plate means 25 and lock pin means 27.

With specific reference to FIG. 2 the corner fitting 19 includes a top wall 30, a front wall 31, and a side wall 32 having elongated top aperture 33, front aperture 34 and side aperture 35 respectively. The front wall 31 and side wall 32 of the fitting terminate short of intersection to define a vertical groove 37 from which projects a bifurcated portion having an upper lug 38 and a lower lug 39. The lugs include vertically aligned apertures 40 which in the non-assembled state relative to the corner fitting of an adjacent container receives the aforementioned locking pin 27. The outer marginal edges of the lugs 38, 39 do not extend beyond the confines of the recess 37 but are shown as being coplanar with the intersecting side walls 31, 32 of the corner fitting.

With reference now to FIG. 1 containers 11, 13 are shown as being positioned in an interface relationship with container 15. In order to interlock or couple adjacently disposed corner fittings of one container with those corner fittings of an adjacent container, spanner or interlock plate means 25 are provided, see FIGS. 3 and 4. The lock plate in the form illustrated is generally elongated and includes a pair of tongue portions 45 having apertures 46 which when the plate is in wedged assembled interlocking relationship are aligned with the lugs 38, 39 of adjacent corner fittings 19. As seen in FIG. 3 the lower marginal edge of the plate includes a straight edge portion 47 which becomes coplanar with side walls 31 of the adjacent fittings when assembled with the lugs of the fitting. The upper edges 48 are curved in a manner to match the curvature of recess 37 in the corner fitting. The curved edge portions 48 of the lock plate coact with the compound curved merging portions of the lugs 38,39 with the recessed surfaces 37 of the end fitting to aid the alignment of one container relative to the adjacent container. With reference to FIG. 4 of the drawing the outer ends or tongue portions 25 of the interconnecting plate are wedge shaped and include upper and lower tapering surfaces 50 and 51 respectively. Correspondingly lugs 38 and 39 include inner tapering surfaces 53, 54 respectively which complementally coact and ride on surfaces 50, 51 of the plate 45. Thus as seen in FIG. 5 with the plate 45 assembled in the left hand corner fitting 19 of the container 15 (see also FIG. 1 and with the same secured in place with lock pin 27 upon movement of container 11 toward container 15 the above coacting surfaces of the plate and lugs operate to cam the containers in vertical alignment with one another. Thereafter the other lock pin 27 shown to the right of FIG. 5 may be driven in by means of a hammer in the aligned apertures 40, 46 in the lugs 38, 39 and tongue 45 respectively as shown in FIG. 6. In order to disassemble the containers, the reverse procedure may be followed to drive out the lock pins 27.

From the foregoing description it can be seen that the above described coupling structure enables small modulii 13, 13 or containers to be assembled in standard sized arrays corresponding to container 15. Upon reaching a field destination, the arrays can be separated into smaller units that can be handled by available equipment for subsequent transport. Moreover the above described coupling structure may be operated by personnel of limited skill and with simple hand tools, i.e. hammer, and screw driver. The above described construction provides vertical as well as lateral alignment of adjacently assembled containers, and is capable of absorbing tension, compression, and shear loads irrespective of whether containers are rolled or lifted by cable crane, or fork lift truck.

What is claimed is:

1. A cargo container interlock and alignment structure for a pair of cargo containers to join the same in opposed adjacent relationship, comprising a pair of fittings one being mounted in one container of said pair and the other in said other container of said pair, each corner fitting of said pair having surfaces defining a recessed portion, a bifurcated portion having a pair of apertured spaced apart lugs integral with and projecting from the surfaces defining said recess, plate means having apertured tongue portions for interlocking engagement with said lugs, and pin means adapted to pass through said lugs and tongue portions to interlock said pair of containers.

2. In the cargo container interlock and alignment structure as set forth in claim 1 wherein said lugs of each of said corner fittings include surfaces diverging outwardly of one another and said tongue portions of said interlock plate include surfaces which taper outwardly for engagement with said lugs.

3. In the cargo container interlock and alignment structure as set forth in claim 1 wherein said interlock plate when assembled with said lugs includes marginal edges having surfaces which conform to the recessed portions of said adjacent fittings and thereby enable alignment of one container relative to the other container.

* * * * *